United States Patent [19]

Kobayashi et al.

[11] Patent Number: 5,769,382

[45] Date of Patent: Jun. 23, 1998

[54] SUPPORTING STRUCTURE FOR VIBRATION GENERATING MOTOR USED IN COMPACT ELECTRONIC DEVICE

[75] Inventors: Yasuhiro Kobayashi, Tokyo; Tatsuya Mori, Shizuoka, both of Japan

[73] Assignee: NEC Corporation, Tokyo, Japan

[21] Appl. No.: 552,846

[22] Filed: Nov. 3, 1995

[30] Foreign Application Priority Data

Nov. 10, 1994 [JP] Japan .................................. 6-276191

[51] Int. Cl.⁶ ..................................................... F16M 3/00
[52] U.S. Cl. ........................................... 248/638; 248/676
[58] Field of Search ..................................... 248/638, 678, 248/676, 680, 671, 674; 310/81; 340/311.1

[56] References Cited

FOREIGN PATENT DOCUMENTS

H5-28914 7/1993 Japan .
0 953 057 3/1964 United Kingdom .
2 259 205 3/1993 United Kingdom .

*Primary Examiner*—Ramon O. Ramirez
*Attorney, Agent, or Firm*—Scully, Scott, Murphy & Presser

[57] ABSTRACT

The present invention includes a motor for generating vibration, an upper casing half having first ribs for supporting the motor and a lower casing half having second ribs for supporting the motor and a motor receiving portion for receiving the motor. The present invention further includes a printed circuit board arranged adjacent to the motor receiving portion and a motor holder formed from a thin sheet and having a friction portion to be in frictional contact with the first and second ribs.

12 Claims, 4 Drawing Sheets

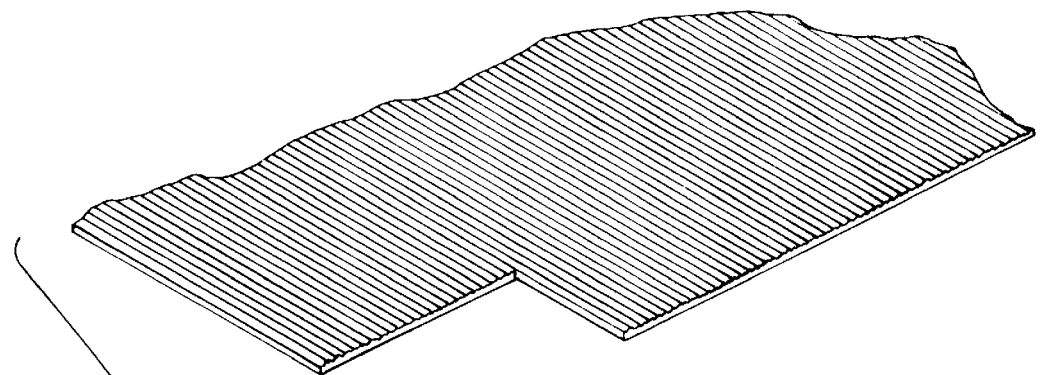
FIG.3(a)
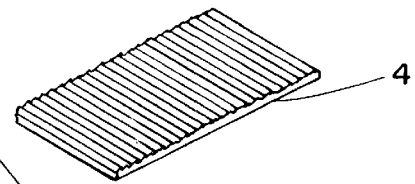
FIG.3(b)
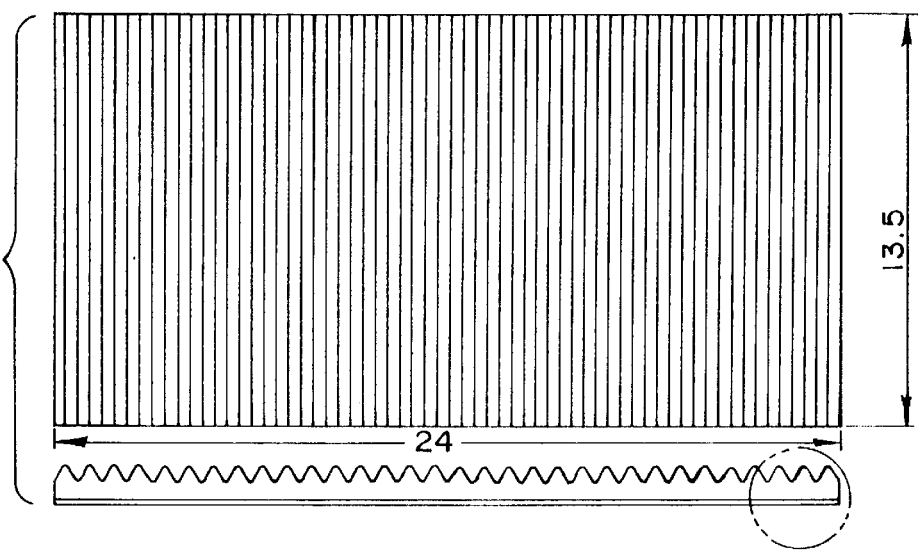
FIG.3(c)
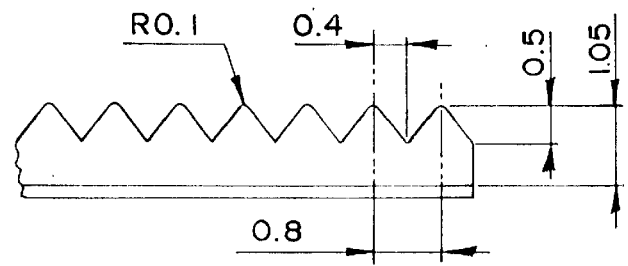

{ 5,769,382 }

SUPPORTING STRUCTURE FOR VIBRATION GENERATING MOTOR USED IN COMPACT ELECTRONIC DEVICE

BACKGROUND OF THE INVENTION

The present invention relates to a supporting structure for a vibration generating motor and, more particularly, to a supporting structure for a vibration generating motor for use in a compact electronic device.

A vibration generating motor (referred to as simply "motor", hereinafter) is used in, for example, a selective calling receiver in which vibration is generated by the motor when the receiver notifies a user call information.

However, when the selective calling receiver generates vibration by means of the motor thereof, there may be a resonance between a high frequency component of the vibration and other electronic parts within the receiver, resulting in irregular sound. Since vibration generated is used when a notification of call information by means of sound is undesirable, in such a case where the selective calling receiver is used in a quiet environment, restriction of irregular sound generation is important problem.

Japanese Utility Model Publication No. H5-28914 (JP-Y2-05-28914) discloses a supporting structure of a vibration generating motor for use in a selective calling receiver.

In the disclosed supporting structure, the motor is pressure-inserted into a motor receiving hole of a molded rubber holder having an outer configuration which can be fitted in a motor receiving space provided in a battery case.

In this supporting structure, high frequency components of vibration generated by the motor are absorbed by the rubber holder. Therefore, resonance between the high frequency components of the vibration and electronic parts within the selective calling receiver is restricted and thus generation of irregular sound is restricted.

Although the restriction of irregular sound is achieved by the disclosed motor supporting structure, a configuration of the rubber holder depends upon a configuration of a motor and it is necessary to produce rubber holders every type of motor. Since there are many types of motor, there is a problem of cost performance in producing the rubber holders.

Further, in the disclosed motor supporting structure, a wall thickness of the rubber holder must be large enough to restrict generation of irregular sound and, therefore, the size of the rubber holder itself becomes large necessarily which causes miniaturization of a compact electronic device using such vibration generator to be difficult.

SUMMARY OF THE INVENTION

An object of the present invention is to generalize a fabrication of a motor supporting structure.

Another object of the present invention is to promote a miniaturization of a compact electronic device including a motor.

A further object of the present invention is to construct a motor holder for supporting a motor of a compact electronic device with a thin sheet of elastic material which has a plurality of parallel ribs on one surface thereof.

In order to achieve the above objects, in the motor supporting structure according to the present invention, a motor holder for supporting a motor for generating vibration in a space provided in a casing of an electronic device comprises a thin sheet of elastic material, which tightly wraps the motor.

Since, in the above construction of the motor supporting structure, the motor holder is provided by a piece of a rectangular thin sheet cut from a large thin sheet, it is possible to generalize the fabrication of the motor holder regardless of the configuration and size of motor.

Further, since the motor holder is in the form of thin sheet, it contributes to miniaturization of the compact electronic device.

Further, with the provision of the linearly extending parallel ribs on the thin sheet, it is possible to effectively restrict generation of irregular sound.

BRIEF DESCRIPTION OF THE DRAWINGS

These and other objects, features and advantages of the present invention will become more fully apparent from the following detailed description taken in conjunction with the accompanying drawings, in which:

FIGS. 3(*a*), 3(*b*) and 3(*c*) are a perspective view, a plan view and a cross sectional view of the holder structure shown in FIG. 1, respectively, showing a fabrication method thereof.

DETAILED DESCRIPTION OF THE PREFERRED EMBODIMENT

Figure 1:
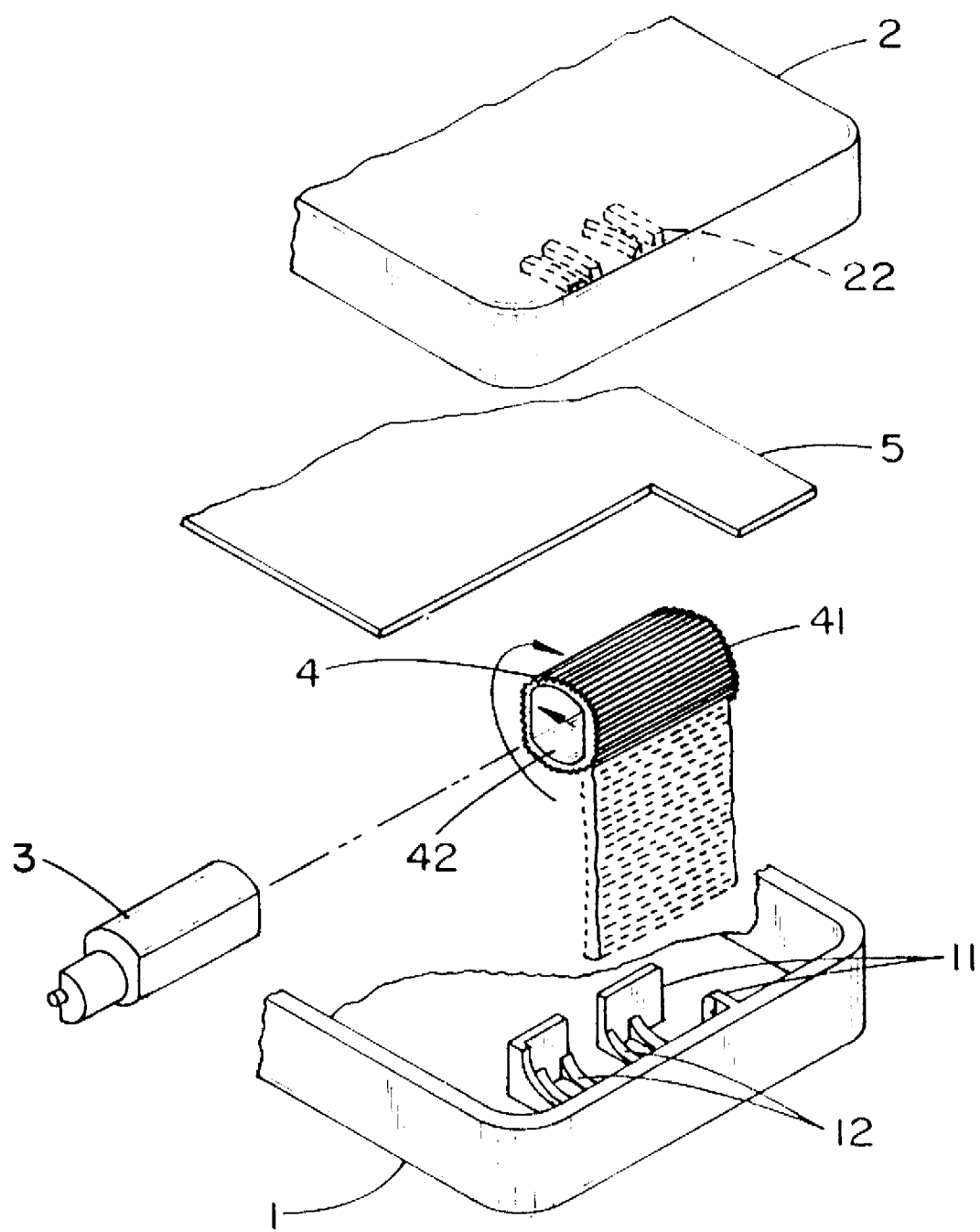
FIG. 1 is a perspective view of a holder structure of a motor for generating vibration which is used in a compact electronic device, according to an embodiment of the present invention.
Figure 2:
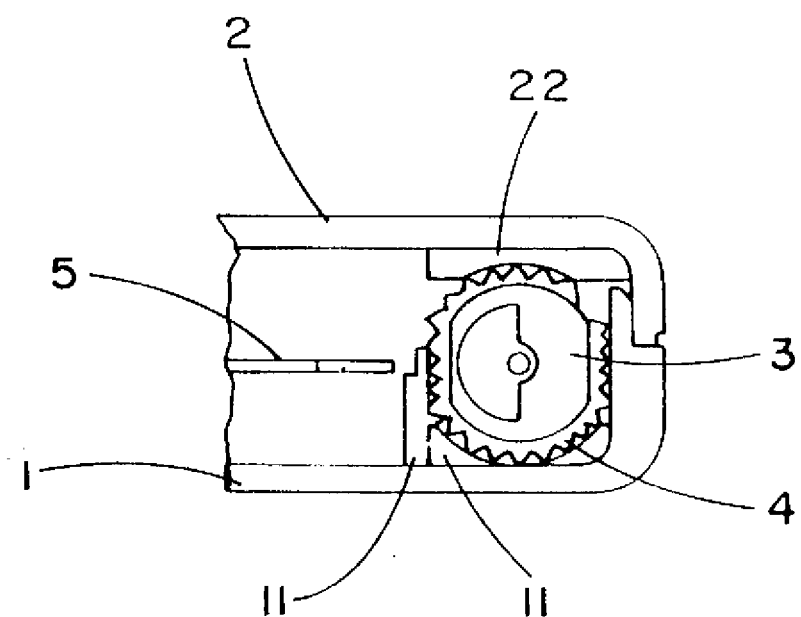
FIG. 2 is a cross section of the holder structure shown in FIG. 1.

In FIGS. 1 and 2, a casing of a compact electronic device is provided by assembling a lower casing half 1 and an upper casing half 2 both of which are provided by plastic molding.

The upper casing half 2 is formed on a portion of an inner surface thereof, in which a motor receiving space is to be provided, with a plurality (two in FIG. 1) of parallel ribs 22 for holding a vibration generating motor 3. The ribs 22 extend perpendicularly to an axis of the vibration generating motor 3 to be received in the motor receiving space of the electronic device.

The lower casing half 1 is formed on a portion of an inner surface thereof, in which the motor receiving space is to be provided when the upper and lower casing halves 2 and 1 are assembled, with a plurality of positioning ribs 11 for defining a position of the vibration generating motor 3 in an axial and radial directions when the vibration generating motor 3 is received in the motor receiving space.

The lower casing half 1 is further formed in the motor receiving space with a plurality of parallel motor holding ribs 12 which extend perpendicularly to the axis of the vibration generating motor 3. Positions of the motor holding ribs 12 correspond to those of the positioning ribs 11 of the upper casing half 2, respectively.

The upper and lower casing half 2 and 1 are assembled with a printed circuit board 5 in between them. On the printed circuit board 5, various electronic components of the compact electronic device are mounted and an edge portion of the printed circuit board 5 is in contact with the positioning ribs 11 in the casing of the compact electronic device.

A motor holder 4 in the form of a rectangular thin sheet having a double faced adhesive tape 42 fixed on one surface thereof through one adhesive face of the tape is fixedly wound on a peripheral surface of the vibration generating motor 3 by the other adhesive surface of the adhesive tape 42. The vibration generating motor 3 with the holder 4 thereon is received in the receiving space defined in the casing by the positioning ribs 11.

The other surface of the rectangular thin sheet which is of, for example, silicon rubber and forms the holder 4, which becomes an outer surface thereof when wound on the motor 3, is undulated to provide a plurality of parallel ribs 41 extending in an axial direction of the motor 3. The parallel ribs 41 function to effectively restrict irregular sound to be generated by the motor 3 when the latter is actuated. The thickness of the holder 4 is smaller than the wall thickness of the conventional molded rubber holder by 0.5 to 1.0 mm.

The structure of the holder 4 and a fabrication method thereof will be described with reference to FIGS. 3(a), 3(b) and 3(c).

As shown in FIG. 3(a), the holder 4 can be obtained by cutting a portion of a single thin silicon rubber sheet having one surface on which the parallel ribs 41 are formed and the other surface adhered to one surface of the double faced adhesive tape 42. Dimension of the thin silicon rubber sheet portion depends upon a size and configuration of a specific motor 3. The thin silicon rubber sheet portion 4 is rounded to fit on the configuration of the motor and adhered to the outer surface of the motor through the other surface of the adhesive tape 42, with the parallel ribs 42 of the sheet portion 4 being in the axial direction of the motor 3.

FIG. 3(b) shows an example of the dimensions of the thin silicon rubber sheet portion 4. In FIG. 3(b), the rectangular sheet portion 4 is 24 mm long and 13.5 mm wide.

FIG. 3(c) shows an example of dimensions of the parallel ribs 41 of the thin silicon rubber sheet portion 4. In FIG. 3(c), a top portion of each rib 42 is rounded with radius of curvature being 0.1 mm. The pitch of the ribs 41 is, for example, 0.8 mm and the height is 0.5 mm. The thickness of the sheet 4 measured from the top of the ribs on the one surface thereof to the other surface is 1.05 mm.

Returning to FIGS. 1 and 2, the assembling procedure of the supporting structure of the vibration generating motor 3 will be described.

First, in FIG. 1, the vibration generating motor 3 is tightly wrapped by the rectangular sheet 4 with the aid of the one surface of the adhesive tape 42 of the rectangular sheet 4.

Then, the vibration generating motor 3 wrapped by the sheet 4 is put in the space portion of the lower casing half 1, which is defined by the positioning ribs 11, such that the parallel ribs 41 of the sheet 4 become perpendicular to the ribs 12.

After the vibration generating motor 3 is received in the space portion of the lower casing half 1, the printed circuit board 5 is disposed on the casing half 1 such that the edge portion of the circuit board 5 is in contact with the ribs 12.

Finally, the upper casing half 2 is put thereon such that the ribs 11 becomes perpendicular to the ribs 41 and is fixedly secured to the lower casing half 1, with the circuit board 5 being in between the upper and lower casing halves 1 and 2.

In this final securing step, the motor 3 is fixed in the motor receiving space defined by the space halves of the upper and lower casing halves 1 and 2 by means of the parallel ribs 41 of the holder 4, the upper and lower supporting ribs 12 and 22 of the upper and lower casing halves 1 and 2, as shown in FIG. 2.

High frequency components of vibration, due to which irregular sound is generated, is absorbed by the parallel ribs 41 formed on the outer surface of the holder 4 of silicon rubber. Further, since, in the present invention, the upper and lower supporting ribs 12 and 22, the positioning ribs 11 and the upper and lower casing halves 1 and 2 are of plastic material and the motor holder 4 is formed on its outer surface with the linear ribs 41 extending perpendicularly to the upper and lower supporting ribs 12 and 22 in contact therewith, high frequency component of vibration generated by the motor 3 is effectively absorbed.

It is possible to change frequency of the high frequency component of vibration generated by the motor 3 by changing the pitch of the ribs 41 of the thin sheet.

Therefore, even if the material of such as the casing is changed and thus frequency of high frequency component of vibration to be absorbed is changed, it is possible to absorb such frequency by changing the pitch of the ribs 41.

Next, spectral characteristics of vibration generated by the motor 3 will be described with reference to FIG. 4.

Figure 4:
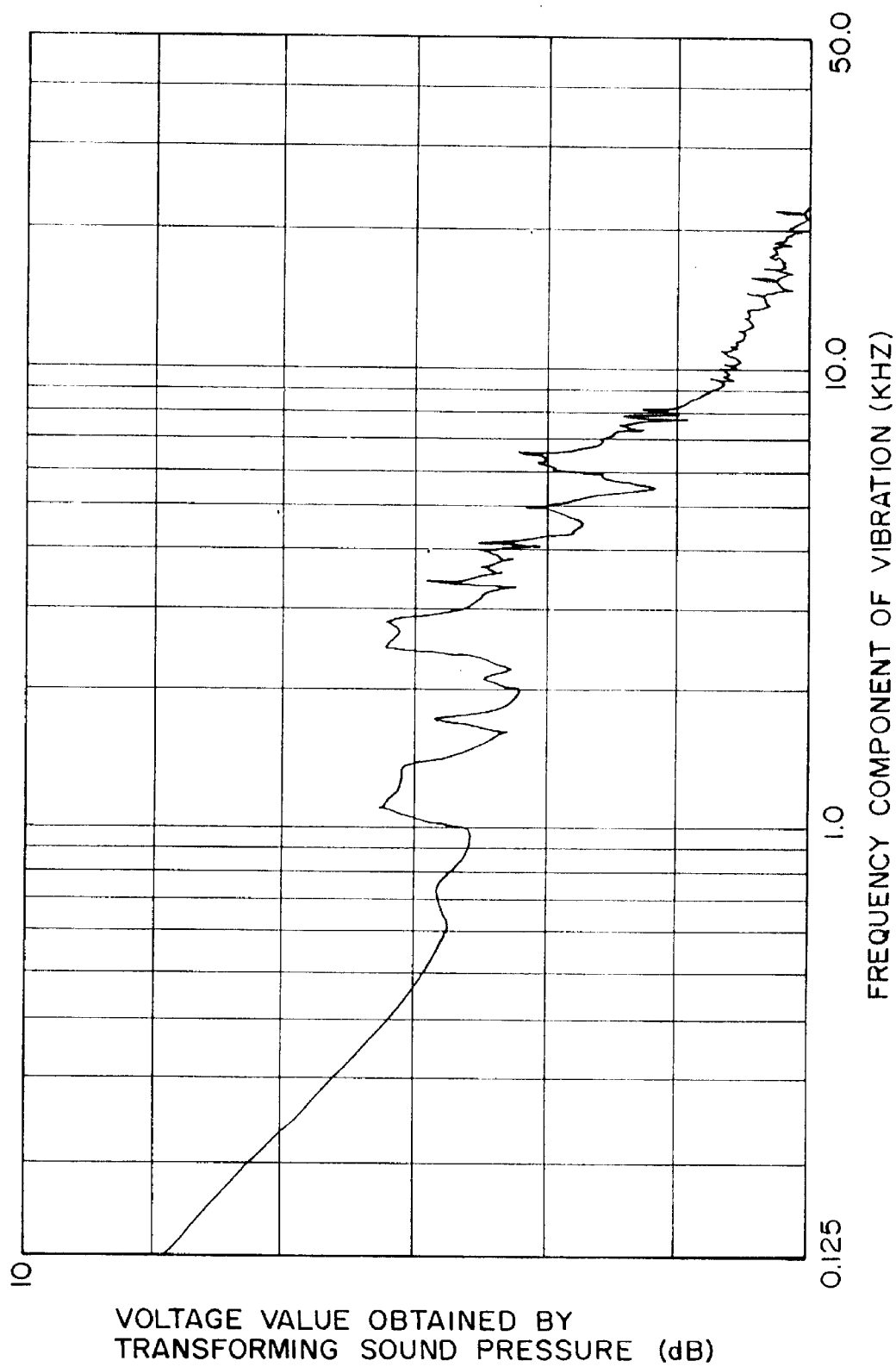
FIG. 4 is a characteristics curve showing spectrum of vibration generated by a motor supported by the holder shown in FIG. 1.

The spectral characteristics shown in FIG. 4 was measured by using RB403 Digital Spectrum Analyzer commercially available from Advantest. In FIG. 4 abscissa shows frequency component of vibration generated by a motor 3 having the present motor holder 4 and ordinate shows voltage value obtained by transforming sound pressure of vibration.

In a conventional compact electronic device, irregular sound is usually generated by resonance of a printed circuit board 5 at a motor vibration frequency of 6–8 kHz. However, in the present invention, irregular sound having frequencies within such frequency range is substantially absorbed as shown in FIG. 4.

As described, in the present invention which employs the thin sheet of elastic material as the motor holder, the manufacture of the motor holders is generalized and an initial investment for the manufacture of motor holders can be substantially reduced. Further, it is possible to reduce the size of the compact electronic device, that is, the width and height of the device can be reduced by 1–2 mm, respectively, compared with the conventional device.

Obviously, numerous additional modifications and variations of the present invention are possible in light of the above teachings. It is, therefore, to be understood that within the scope of the appended claims the invention may be practiced otherwise than as specifically described herein.

What is claimed is:

1. A supporting structure of a motor for generating vibration, comprising:
   a motor receiving portion for receiving said motor;
   a motor holder formed by tightly wrapping said motor with a thin sheet;
   an upper casing half having first ribs for supporting said motor; and
   a lower casing half having second ribs for supporting said motor and having said motor receiving portion.

2. The supporting structure claimed in claim 1, wherein said upper and lower casing halves are made of plastic material.

3. The supporting structure claimed in claim 1, wherein said first ribs are formed opposite in positions to said second ribs, respectively.

4. The supporting structure claimed in claim 1, wherein said motor holder is formed on its surface with a friction portion in frictional contact with said first and second ribs.

5. The supporting structure claimed in claim 4, wherein said friction portion comprises a plurality of linearly extending ribs.

6. The supporting structure claimed in claim 5, wherein said motor is supported by an orthogonal crossing of the plurality of said linearly extending ribs and said first and second ribs.

7. The supporting structure claimed in claim 5, wherein the number of said linearly extending ribs and the pitch of said linearly extending ribs are determined by frequency components of vibration generated by said motor which are to be restricted.

8. The supporting structure claimed in claim 4, wherein said friction portion is formed of silicon rubber.

9. A supporting structure of a motor for generating vibration, comprising:

a motor receiving portion for receiving said motor;

a motor holder formed by tightly wrapping said motor with a thin sheet; and a printed circuit board having an edge portion arranged adjacent to said motor receiving portion.

10. A supporting structure of a motor for generating vibration, comprising:

a motor receiving portion for receiving said motor; and a motor holder formed by tightly wrapping said motor with a thin sheet, wherein said thin sheet has a double-sided adhesive sheet adhered with one side adhesive to one surface of said thin sheet and said motor holder is formed by rolling said thin sheet around said motor with the other side adhesive being adhered to a peripheral surface of said motor.

11. A setting method for setting a motor holder for supporting a motor for generating vibration in a casing of a compact electronic device, said casing being composed of an upper casing half and a lower casing half, said method comprising the steps of:

cutting a rectangular thin sheet portion from a large thin sheet;

adhering said rectangular thin sheet portion to said motor;

setting said motor having said rectangular thin sheet adhered thereto in a predetermined position within said lower casing half; and bonding said upper casing half onto said lower casing half.

12. The setting method claimed in claim 11, further comprising, between said setting step and said bonding step, the step of arranging a printed circuit board in the vicinity of said predetermined position.

* * * * *